(12) United States Patent
Mentink (10) Patent No.: US 12,305,676 B2
(45) Date of Patent: May 20, 2025

(54) FLOW RESTRICTING ORIFICE

(71) Applicant: KA Group AG, Zürich (CH)

(72) Inventor: Laurentius Andreas Gerardus Mentink, Haaksbergen (NL)

(73) Assignee: KA Group AG, Zurich (CH)

(*) Notice: Subject to any disclaimer, the term of this patent is extended or adjusted under 35 U.S.C. 154(b) by 4 days.

(21) Appl. No.: 18/555,073

(22) PCT Filed: Apr. 21, 2021

(86) PCT No.: PCT/EP2021/060345
§ 371 (c)(1),
(2) Date: Oct. 12, 2023

(87) PCT Pub. No.: WO2022/223106
PCT Pub. Date: Oct. 27, 2022

(65) Prior Publication Data
US 2024/0191732 A1    Jun. 13, 2024

(51) Int. Cl.
*F16D 1/02* (2006.01)
*F15D 1/02* (2006.01)
*F16L 33/20* (2006.01)

(52) U.S. Cl.
CPC .............. *F15D 1/025* (2013.01); *F16L 33/20* (2013.01); *F16L 2201/10* (2013.01)

(58) Field of Classification Search
CPC ... F15D 1/025; F16L 2201/60; F16L 2201/10; F16L 33/20; F16L 33/225; F16L 33/227; F16L 33/30

(Continued)

(56) References Cited

U.S. PATENT DOCUMENTS 5,257,548 A * 11/1993 Pardy .................... F16L 37/098
73/862.01
7,063,359 B2 * 6/2006 Vallee ................. F16L 37/0915
285/308

(Continued)

FOREIGN PATENT DOCUMENTS

DE     102013113813 A1    6/2015
EP         1538383 A1    6/2005

OTHER PUBLICATIONS

International Search Report for Application No. PCT/EP2021/060345 dated Jan. 5, 2022, 2 pages.

(Continued)

*Primary Examiner* — David Bochna
(74) *Attorney, Agent, or Firm* — Howard & Howard Attorneys PLLC (57) ABSTRACT

An assembly for connecting a tube having a tube connector and a flow restricting orifice. The flow restricting orifice includes a tubular nozzle having an insert portion for insertion into a mouth of the tube connector and a visible marking having a marking element which extends radially outwardly from the tubular nozzle and which includes a frangible connection which is connected to the tubular nozzle and which has at least one predetermined breaking point. The frangible connection is configured to release the marking element when the frangible connection is broken before the tube is completely pushed onto the tube connector. The marking element is configured to be retained on the tube connector or on a tube connected to the tube connector to remain, wherein the flow restricting orifice is fitted in a mouth of the tube connector.

16 Claims, 7 Drawing Sheets (58) Field of Classification Search
USPC .......................................................... 285/3, 4
See application file for complete search history.

(56) References Cited

U.S. PATENT DOCUMENTS 7,922,213 B2 * 4/2011 Werth ................... F16L 33/225
285/259
2016/0208751 A9 7/2016 Barthel et al.

OTHER PUBLICATIONS

Machine-assisted English language abstract for DE 10 2013 113 813 A1 extracted from the espacenet.com database on Nov. 30, 2023, 2 pages.

* cited by examiner

FLOW RESTRICTING ORIFICE

CROSS-REFERENCE TO RELATED APPLICATIONS

This application is the National Stage of International Application No. PCT/EP2021/060345, filed on Apr. 21, 2021, which is incorporated herewith by reference in its entirety.

FIELD OF THE INVENTION

The present invention is directed to a flow restricting orifice to be fitted into a mouth of a tube connector. A flow restricting orifice is a nozzle insert for reducing the cross-section to thereby restrict the flow to a desired degree.

BACKGROUND

In the automotive industry flow restricting orifices are for example used in connection with cooling of batteries or cooling of different portions of a single battery of an electrically driven vehicle. Normally a single source of cooling fluid is available in a vehicle. For several regions where cooling is required several tube connectors are provided which are supplied with cooling fluid from the cooling fluid source and which transfer cooling fluid via tubes connected thereto to the individual regions. Since each region to be cooled may need a different degree of cooling, i.e. some regions the battery may generate more heat than others during charging of the battery, the amount of cooling provided by cooling fluid flowing through each individual tube has to be set for each individual tube. This is done by providing a set flow of restricting orifices, the flow restricting orifices offering a range of sizes and accordingly provide different degrees of flow restriction. A flow restricting orifice in the form of a tubular nozzle of reduced diameter is selected for each tube connector according to the flow restriction needed and is inserted into the mouth of the tube connector.

A flow restricting orifice of this kind is for example described in DE 10 2013 113 813 A1 which discloses a tube connector, in particular a fir-tree connector, having a port with a fir-tree structured outer surface onto which a tube is pushed for connecting it to the tube connector. The flow restricting orifice comprises a tubular nozzle comprising an insertion portion for inserting into the mouth of a tube connector, and an outer end portion with a shoulder for limiting movement of the tubular nozzle into the mouth of the tube connector. The degree of flow restriction of the flow restricting orifice is determined by the inner diameter of the tubular nozzle.

Currently the size of the flow restricting orifice, or in other words the degree of flow restriction provided by the flow restricting orifice, is indicated by a colour marking for each size type of flow restricting orifices. In other words the colour of the flow restricting orifice is a code for the degree of flow restriction provided by a particular orifice. In this manner an operator can pick particular flow a restricting orifice out of a set of such orifices by selecting the desired colour orifice and insert it to a mouth of a particular tube connector to which thereafter a tube is to be connected by pushing it onto the tube connector. However, after the tube has been connected to the tube connector the flow restricting orifice is no longer visible. Therefore, after the tubes have been mounted to the tube connectors it is no longer possible to check whether each of the connectors has been provided with a flow restricting orifice, and whether the correct size flow restricting orifice for each particular tube connector has been mounted. This is in particular disadvantageous because after an operator had the task to mount a number of different flow restricting orifices to a number of tube connectors and to connect tubes to the tube connectors, it may occur that uncertainties arise whether each tube connector has been equipped with the desired flow restricting orifice.

SUMMARY

It is an object of the present invention to provide a flow restricting orifice for a tube connector which allows to visually check whether a flow restricting orifice has been mounted in the mouth of a tube connector after the tube has been connected to the tube connector. Preferably, if there is more than one size of a flow restricting orifice, it would be desirable to be able to check which type (size) of flow restricting orifice has been mounted in the mouth of a tube connector after the tube has been connected to the tube connector.

In addition it is an object of the present invention to define a method for equipping a tube connector with a flow resisting orifice and for connecting a tube to the tube connector, which method after it has been carried out allows to check whether and which type of flow resisting orifice is mounted in the tube connector.

The following relates to an assembly for connecting a tube. The assembly comprises a tube connector and a flow restricting orifice. The flow restricting orifice comprises a tubular nozzle having an insert portion for insertion into a mouth of the tube connector and a visible marking having a marking element which extends radially from the tubular nozzle and which includes a frangible connection which is connected to the tubular nozzle and which has at least one predetermined breaking point, the frangible connection being configured to release the marking element when the frangible connection is broken before the tube is completely pushed onto the tube connector, the marking element being configured to be retained on the tube connector or on a tube connected to the tube connector to remain, after a tube has been connected to the tube connector, as a marking element visible from the exterior of the tube, wherein the flow restricting orifice is fitted in a mouth of the tube connector.

In case there is only one type of flow restricting orifice the marking element needs to be visible only but does not need to carry any further information. In case there is more than one type (size) of flow restricting orifice the marking element should be indicative for the type of flow restricting orifice, for example by its size, shape, graphical symbols, characters, numbers or colour. In a preferred embodiment the marking element is a coloured marking element with a colour that is representative for the type flow restricting orifice.

The flow restricting orifice allows to separate the visible marking in the form of a marking element in the course of the assembly of the flow restricting orifice to the tube connector and connecting the tube to the tube connector, wherein the marking element is configured to remain linked to the assembly of tube connector and tube after the tube has been connected to thereby serve as a visible marking. This allows to check flow restricting orifice has been placed in the whether a mouth of the tube connector before the tube has been connected; in this case the marking element is a marker that a flow restricting orifice has been mounted. In case of more than one type of flow restricting orifices this also allows to check by a particular code of the marking element which type of flow restricting orifice has been mounted. As indicated above the code carried by the marking element could be its size, shape, graphical symbols, characters, numbers or colour.

As far as reference is made herein to a "visible" marking or indicator which allows "visual" inspection, this does not imply that a human operator is necessarily required to visually inspect the tubes connected to the tube connectors; the visual check can also be performed with a camera connected to a control unit (computer) which is programmed to perform pattern recognition to check for the presence of the marking element as a final check of tubes connected to tube connectors for the presence of the desired flow restricting orifice. In case the marking element carries information on the type (size) of flow restricting orifice the visual recognition program is arranged to identify the coded information, for example to identify the colour of the marking element.

In a preferred embodiment the marking element is a visible ring element which surrounds the tubular nozzle and which circumferentially extends at least 180° around the tubular nozzle. This shape of the marking element including a ring or a ring segment permits that the visible ring element remains retained around a tube connector or a tube connected to the tube connector, i.e. retained by embracing at least partly the circumference of a tube connector in front of a connected tube and/or the circumference of a front end portion of the tube.

In a preferred embodiment the tubular nozzle of the flow restricting orifice comprises an outer end portion adjoining the insert portion, wherein the outer end portion has a circumferential shoulder for limiting movement of the tubular nozzle into a mouth of a tube connector. In this case the frangible connection is connected to the outer end portion of the tubular nozzle so that the insertion portion the flow restricting orifice can be inserted into a mouth of a tube connector without affecting the frangible connection. Preferably, the outer end portion has at its outer end facing away from the insertion portion a tapering end portion so that the outer diameter is lowest at the end of the outer end portion remote from the insertion portion. This design assists in guiding a tube when the outer end portion is inserted into a mouth of the tube. Preferably also the circumferential shoulder has a tapering shape such that the shoulder has the largest outer diameter at the end of the outer end portion which adjoins the insertion portion. This largest outer diameter is preferably larger than the inner diameter of a tube that is to be connected to a tube connector being equipped with the flow restricting orifice. If this largest outer diameter of the shoulder of the outer end portion has a diameter that is larger than the inner diameter of the associated tube this will prevent that the orifice might be blown out of the mouth of the tube connector and into the tube due to fluid flow out of the tube connector.

According to a preferred embodiment the predetermined breaking point of the frangible connection is, in radial direction of the tubular nozzle, located closer to the tubular nozzle than to the surrounding marking element. This arrangement ensures that, after the frangible connection has been broken, a radially inwardly projecting portion of the frangible connection remains on the marking element. Such inwardly projecting remaining portion of the frangible connection allows the marking element to be pushed forward by a component pushing against the remaining portion of the breakage connection. In particular, it is preferred that the frangible connection is, in radial direction of the tubular nozzle, located closer to the the tubular nozzle than to the surrounding marking element.

In a preferred embodiment the frangible connection is formed by one or more connecting webs radially inwardly extending from the marking element and being connected to the tubular nozzle. The one or more connecting webs have a predetermined breakaging strength. Preferably, the connecting web(s) extend(s) from the marking ring element. Preferrably, the connecting web(s) is (are) connected to an outer end portion of the tubular nozzle adjacent to the insertion portion and having an outwardly projecting shoulder for limiting movement of the tubular nozzle into a mouth of a tube connector. Preferably, several connecting webs are provided which are arranged circumferentially distributed around the outer end portion of the tubular nozzle. Preferably, the width of the one or more radially extending connecting webs is decreasing from the marking ring element towards the outer end portion of the tubular nozzle. In this case the predetermined breaking point is in the area of the lowest width of the one or more connecting webs.

In a preferred embodiment of the flow restricting orifice the visible marking is a colour marking and the marking element is a coloured element.

In a preferred embodiment the marking ring element is a closed ring completely surrounding the circumference of the tubular nozzle. Alternatively the marking ring element is an open ring element including a circumferential gap. The latter design allows the tubular ring element to be elastically expanded by opening the gap further to fit around larger radii.

In a preferred embodiment the visible marking further comprises a visible flag connected to the marking ring element to increase the area of the visible marking to enhance its visibility. Such arrangement is in particular useful for embodiments in which the marking ring element is relatively thin, i.e. has a low axial extension along the axial direction of the tubular nozzle.

In a preferred embodiment the frangible connection is configured to break upon a tube being pushed onto a tube connector, and the marking element is configured to be capable of being pushed onto a tube connector by a front end of a tube being pushed onto a tube connector. In this embodiment breaking of the frangible connection and moving the released marking element forward is automatically achieved by moving a tube onto the tube connector to connect it thereto, wherein the marking element is automatically retained on the tube connector in front of the tube or around a tube end portion.

In a preferred embodiment the marking ring element is formed as an axially extending cylindrical sleeve having an axial length that is larger than half of its outer diameter. In such embodiments the marking ring element in the form of an axially extending cylindrical sleeve can have the function of a so called wedding-band, i.e. it can embrace the front end portion of the tube on the tube connector, thereby increasing the burst strength of the connection of the tube on the tube connector.

In a preferred embodiment of this kind the cylindrical sleeve comprises at least one opening in its outer wall close to its leading end which is leading when it is pushed onto the tube connector by an advancing tube to be connected thereto, wherein the at least one opening is configured to serve as a window to allow visual inspection whether the tube has reached the region within the sleeve in which the at least one opening is located.

In a preferred embodiment the tubular nozzle, the visible marking including the marking element and the frangible connection connected to the tubular nozzle are formed as an integral part in one piece, optionally wherein the flow restricting orifice is an injection molded plastic part.

According to the present invention there is also provided an assembly of a tube connector and a flow restricting orifice, wherein the flow restricting orifice is fitted into a mouth of the tube connector.

The present invention is further directed to a method for equipping a tube connector with a flow restricting orifice and for connecting a tube to the tube connector equipped with the flow restricting orifice. This method comprises the steps of providing an assembly having a tube connector, and a flow restricting orifice, inserting the insert portion of the flow restricting orifice into a mouth of the tube connector, breaking the frangible connection to release the marking element and moving it further along the tube connector, and pushing the tube onto the tube connector to connect it to the tube connector, the marking element remaining as a visible indicator retained around an end portion of the tube connector in front of the connected tube or around a front end portion of the tube.

The sequence of the steps of this method does not define a temporal order. For example the step of inserting the insert portion of the flow restricting orifice into a mouth of the tube connector and the steps of breaking the frangible connection and pushing the tube onto the tube connector can take place simultaneously, for example if the flow restricting orifice is first attached to the front end of a tube, whereafter the tube is pushed towards the tube connector, thereby introducing the insert portion of the flow restricting orifice in the mouth of the tube connector, breaking the frangible connection by pushing the tube further forward, thereby also moving the marking element to move further onto the tube connector to retained there is a visible indicator.

In a preferred embodiment the insert portion of the tubular nozzle is first inserted into the mouth of the tube connector, whereafter the frangible connection is broken by pushing a tube onto the tube connector such that a front end of the tube pushes against the marking element causing the frangible connection to break and to move the marking element forward by advancing the tube until the tube reaches its connected position on the tube connector, thereby leaving the marking element retained on the tube connector or on a front end portion of the tube.

Alternatively, it is also possible to first mount the flow restricting orifice in a mouth of a tube connector, then to break the breakage connection, either manually or using a tool, and then in a separate further step to push a tube onto the tube connector to connect it thereto.

BRIEF DESCRIPTION OF THE DRAWINGS

The present invention will be described in the following with reference to embodiments illustrated in the drawings in which.

DETAILED DESCRIPTION

In the following two embodiments of the present invention will be described, wherein FIGS. 1 to 13 show a first embodiment and FIGS. 14 to 24 show a second embodiment. In both embodiments the visible marking is assumed to be a colour marking, so that the marking element is a coloured marking element which will be referred to as "coloured element" for short, and the marking ring element is a coloured marking ring element which will be referred to as "couloured ring element" for short in the following description. However, it should be kept in mind that other marking types are possible such as size or shape of the marking element, graphical symbols, characters or numbers carried by the marking element etc.

Figure 1:
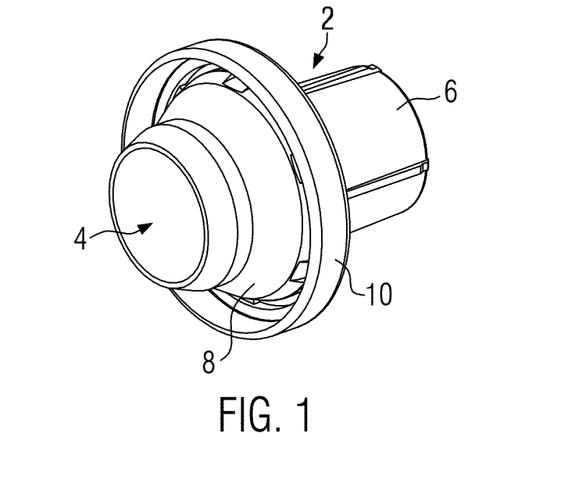
FIG. 1 shows a perspective view of a first embodiment of a flow restricting orifice.

The flow restricting orifice shown in FIG. 1 is a plastic component formed in one piece by injection molding. The flow restricting orifice 2 comprises a tubular nozzle 4 having a passage which reduces the cross-section of a mouth of a tube connector and which in this manner restricts the flow depending on the cross-sectional area of the passage of the tubular nozzle 4. Several flow restricting orifices 2 of different sizes are provided which have the outer same dimensions to fit into a mouth of a tube connector and which have a range of different inner dimensions to provide a range of different cross-sectional areas corresponding to a range of degrees of flow restrictions.

Figure 2:
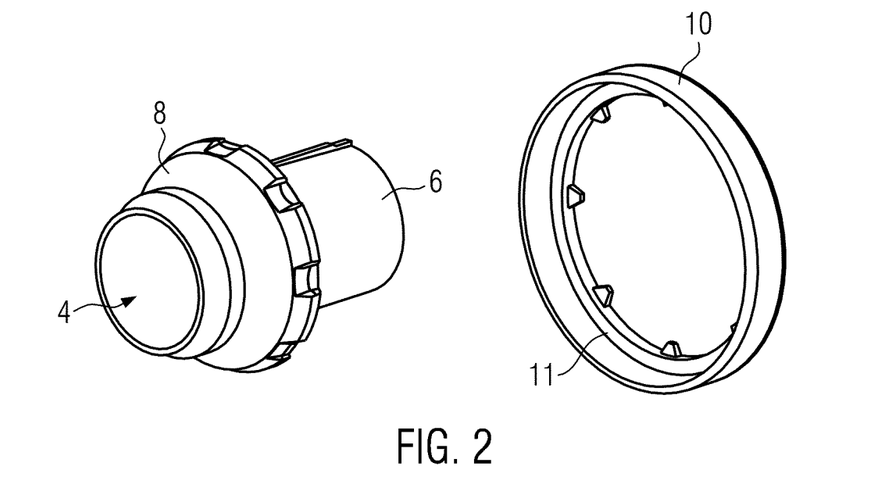
FIG. 2 shows perspective views of the flow restricting orifice of FIG. 1, wherein a coloured ring element has been separated from a tubular nozzle of the flow restricting orifice by breaking the frangible connection between them.
Figure 3:
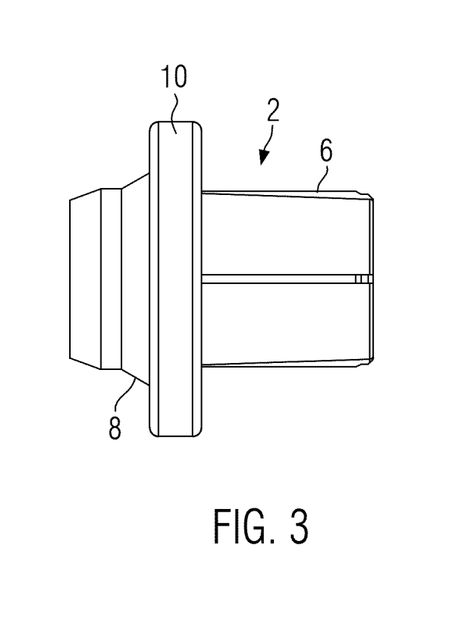
FIG. 3 shows a side view of the flow restricting orifice of FIG. 1.

The flow restricting orifice shown in FIGS. 1 to 5 comprises an insertion portion 6 provided for insertion into a mouth of a tube connector. The outer wall of the insertion portion may, as shown in FIGS. 1 to 3, comprise ribs extending in axial direction of the insertion portion 6. Such ribs on the outer wall of the insertion portion 6 are provided for ensuring a tightly fitting seat of the insertion portion 6 in a mouth of a tube connector and may compensate tolerances of the outer diameter of the insertion portion, namely a certain deviation to a lower outer diameter of the insertion portion compared to the inner diameter of a mouth of a tube connector.

Axially adjacent to the insertion portion 6 an outer end portion 8 of the tubular nozzle 4 is provided. This outer end portion 8 comprises a radially projecting, circumferentially extending shoulder for limiting movement of the flow restricting orifice 2 into a mouth of a tube connector.

The flow restricting orifice 2 further comprises a coloured element 10 which radially extends beyond the outer surfaces of the tubular nozzle 4, in this case a coloured ring element 10 surrounding the tubular nozzle at a greater radius then the tubular nozzle 4. The coloured ring element 10 is connected to the outer end portion 8 of the tubular nozzle 4 by a frangible connection 12 which can be seen best in FIGS. 4 and 5. The frangible connection 12 is formed by a number of radially extending connecting webs which extend from the coloured ring element 10 in radial direction inwardly to the outer end portion 8, thereby connecting the coloured ring element 10 to the outer end portion 8 of the tubular nozzle. In the embodiment shown in FIG. 4 the frangible connection 12 of the coloured ring element 10 comprises six connecting webs which are connecting the coloured ring element 10 to the outer end portion 8 of the tubular nozzle 4 and which are arranged circumferentially distributed around the circumference of the coloured ring element 10. As can be seen in FIG. 5 the connecting webs of the frangible connection 12 have a decreasing width which decreases from the outer ring element 10 towards the outer end portion 8 of the tubular nozzle 4. The connecting webs of the frangible connection 12 have the lowest width at the point of connection to the outer end portion 8. This portion of lowest width of the connecting webs is the weakest portion and therefore forms the predetermined breaking point having a rated breaking strength.

As can be seen in the view of the coloured ring element 10 in FIG. 2, the coloured ring element 10 comprises a radially inwardly projecting, circumferentially extending protrusion 11. As will be explained further below this inwardly projecting protrusion 11 permits that the ring element 10 may be pushed forward by a front end portion of a tube that is inserted into the opening of the coloured ring element 10.

Figure 4:
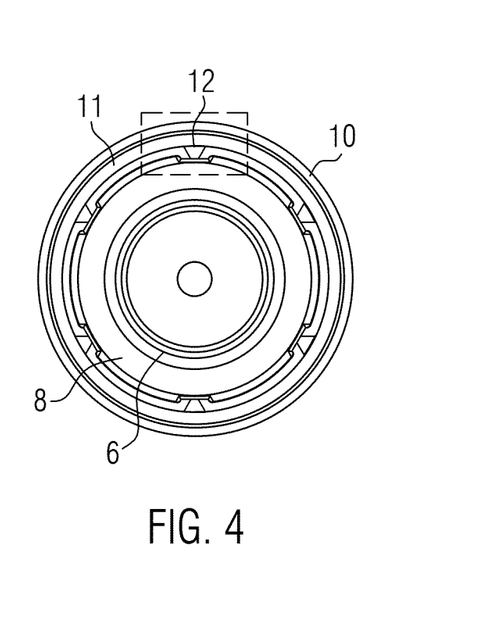
FIG. 4 shows an inner end view of the flow restricting orifice of FIG. 1, looking at an insertion portion of the flow restricting orifice.
Figure 5:
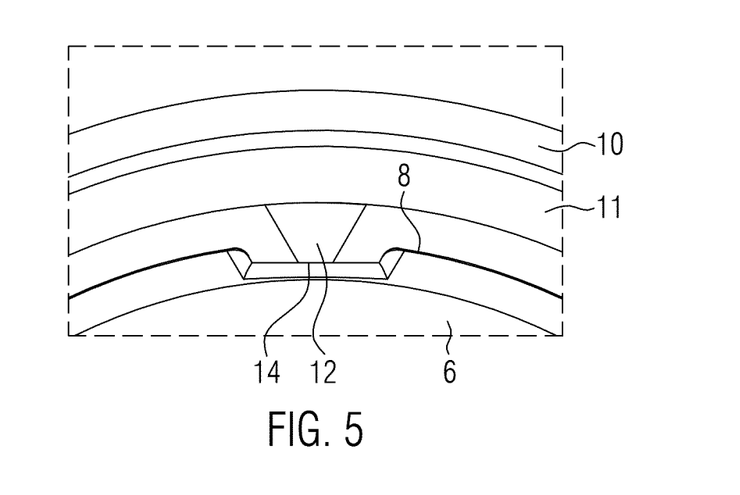
FIG. 5 is a detail of FIG. 4, showing a connecting web as part of a frangible connection of the flow restricting orifice.

As can be seen in FIGS. 4 and 5 the connecting webs of the frangible connection 12 extend between the inner surface of the protrusion 11 of the coloured ring element 10 and the outer surface of the outer end portion 8 of the tubular nozzle 4.

Figures 6, 7:
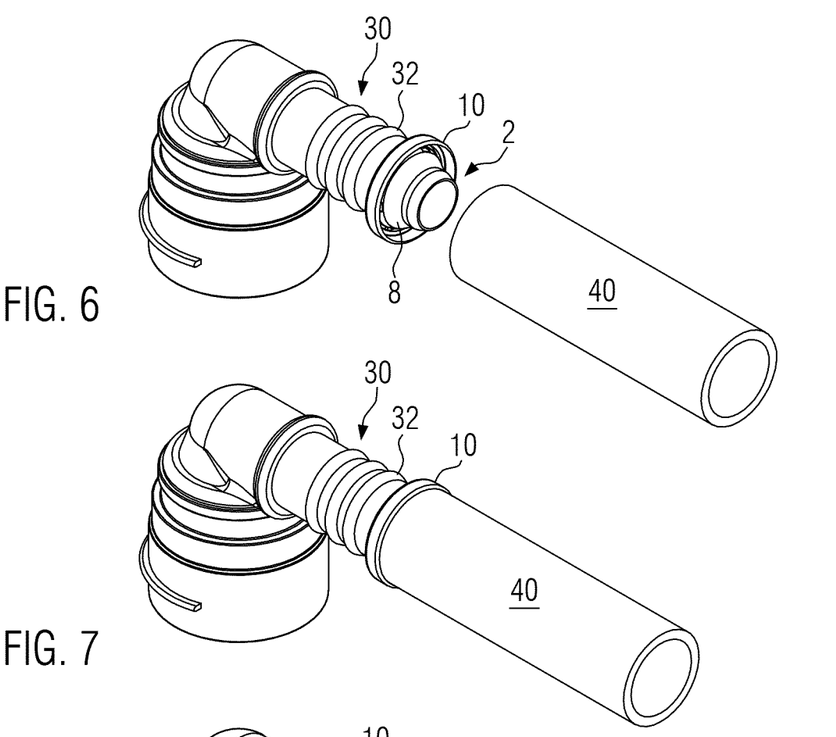
FIGS. 6 to 9 show a sequence of states when a tube is connected to a tube connector which is equipped with the flow restricting orifice of FIG. 1.

It will now be described how the flow restricting orifice 2 of FIGS. 1 to 5 is applied when a tube is to be connected to a tube connector. In this respect reference is made to the sequence of process steps shown in perspective view in FIGS. 6 to 9 and in cross-sectional view in FIGS. 10 to 14. In this example a tube connector 30 is shown which comprises a tubular end portion comprising a so called fir-tree structure on the surface which is designed to hold a tube, for example a plastic tube, that has been pushed onto the tubular fir-tree portion of the tube connector 30. In FIG. 6 a flow restricting orifice 2 has already been inserted with its insertion portion into a mouth of the tube connector 30.

Figure 8:
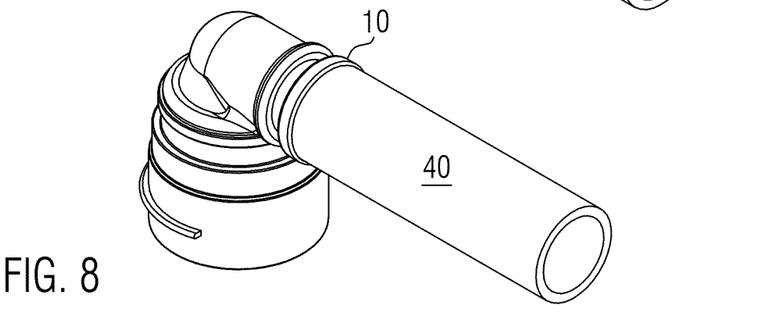
Figure 11:
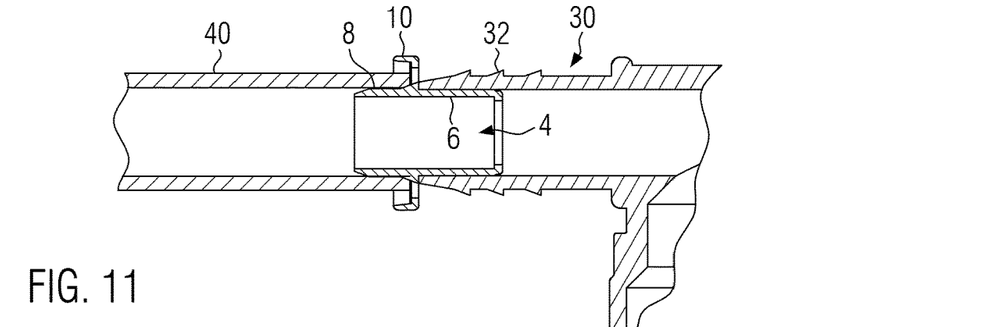
Figure 12:
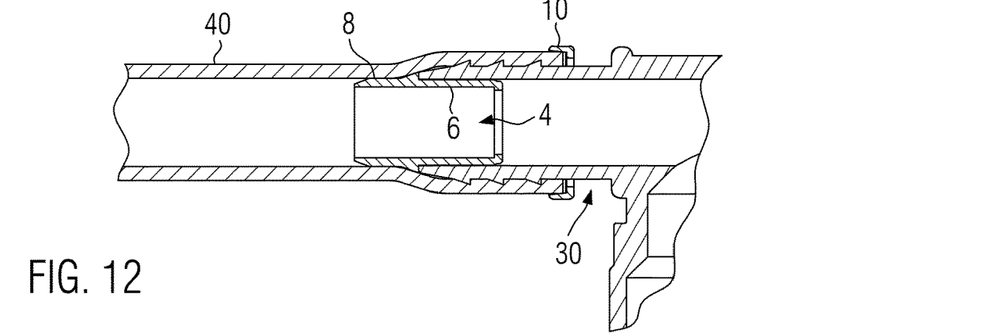

Then a tube 40 is advanced towards the tube connector 30 and is introduced into the annular gap between the outer end portion 8 of the tubular nozzle 4 and the coloured ring element 10, as shown in FIGS. 7 and 11. In the course of advancing the tube 40 its front end comes into abutment against the connecting webs of the frangible connection 12 and against the circumferential protrusion 11 of the coloured ring element 10. When pushing the tube 40 further onto the tube connector the front end of the tube 40 exerts force on the coloured ring element 10 and its frangible connection 12 to the outer end portion 8 of the tubular nozzle 4. Since the tubular nozzle 4 cannot move further into the mouth of the tube connector 30 in response to such force the frangible connection 12 breaks, thus releasing the coloured ring element 10 and permitting the coloured ring element to follow the forward movement of the tube being pushed onto the tube connector 30. As can be seen in FIG. 8 and FIG. 12 the front end of the slightly expanded tube pushes the coloured ring element 10 ahead, wherein the front end face of the tube abuts against the protrusion 11 of the coloured ring element 10. The tube 40 is slightly expanded when it is pushed onto the fir-tree portion 32 of the tube connector.

Figure 9:
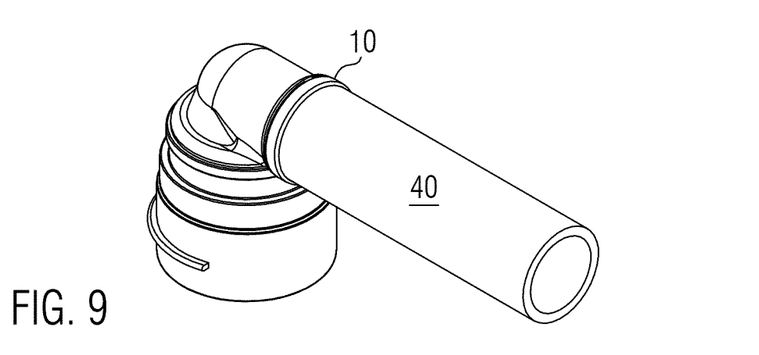
Figure 10:
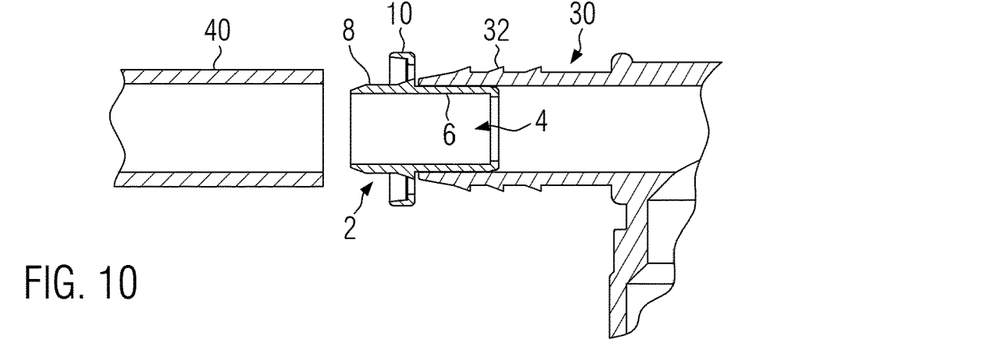
FIGS. 10 to 13 show cross-sectional views of the sequence of states when the tube is connected to the tube connector which is equipped with a flow restricting orifice of FIG. 1.
Figure 13:
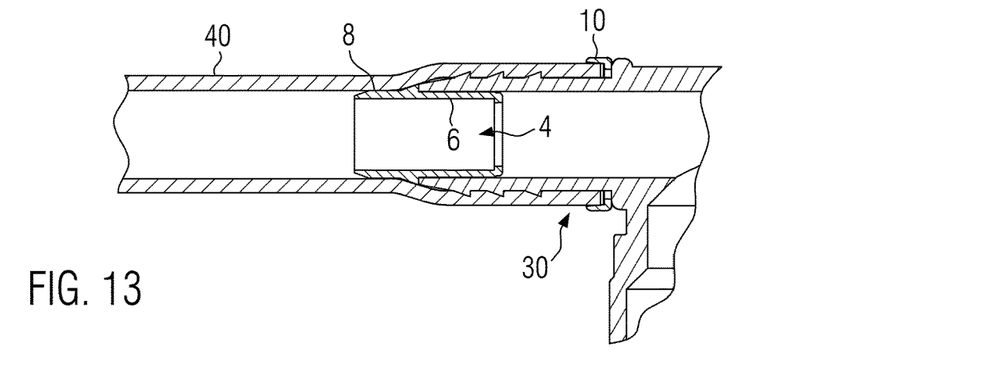

Eventually the tube reaches its connected position in which the protrusion 11 of the coloured ring element is pressed against a circumferential collar of the tube connector, as can be seen in FIGS. 9 and 13.

In this manner the coloured ring element 10 remains as a visible indicator after tube 40 has been connected to the tube connector 30. This visible indicator permits a simple visual check whether a flow restricting orifice is present in the tube connector and which size the flow restricting orifice in the connected tube has, i.e. which degree of flow restriction is provided by the particular flow restricting orifice which is indicated by the colour of the coloured ring element.

The coloured ring element 10 is configured to be retained extending around the front end portion of the connected tube and around the tube connector. In the illustrated embodiment the coloured ring element is a closed ring that is by its closed shape prevented from falling off. In principle, also other designs of the coloured ring element 10 are possible, for example an open ring element with a circumferential gap that extends more than 180° around the circumference of the tube connected to the tube connector. In principle also other designs of coloured elements, other than rings or rings elements, are possible as long as the coloured element is provided with shape features that are arranged to interact and engage with complementary shape feature on the tube or on the connector which ensures that the coloured element is retained by engagement of the shape features on assembly of the tube on the tube connector. For example, the coloured element could have any other shape and include forwardly projecting pin or web that is guided and received in a bore of complementary cross-section formed in the collar of the tube connector for receiving the pin for retaining the coloured element on the tube connector.

Figure 14:
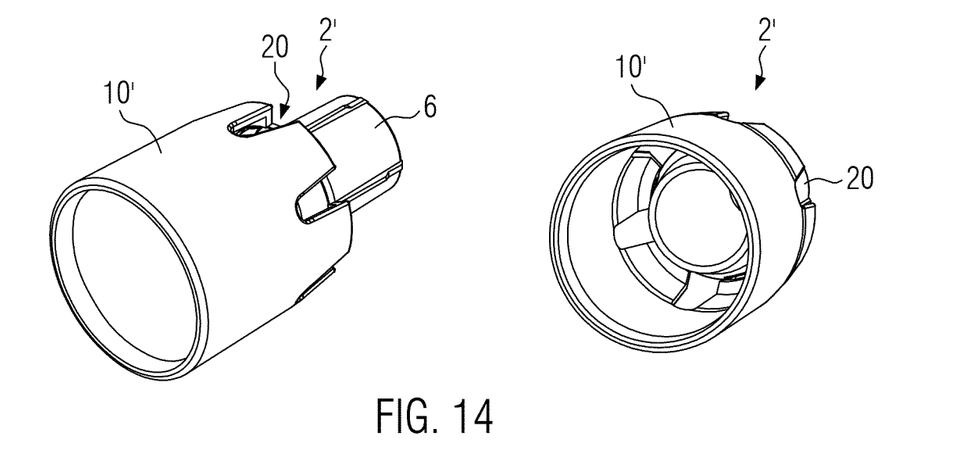
FIG. 14 shows perspective views of a second embodiment of a flow restricting orifice.
Figure 15:
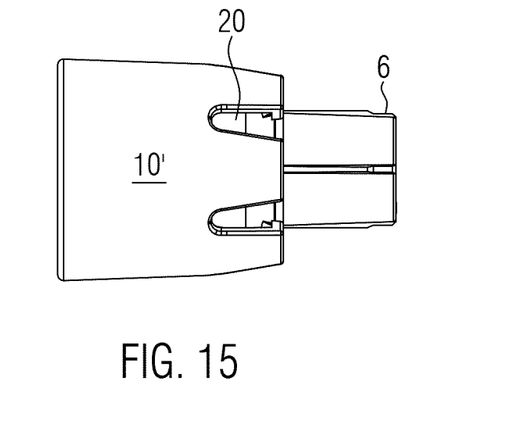
FIG. 15 shows a side view of the flow restricting orifice of FIG. 14.
Figure 16:
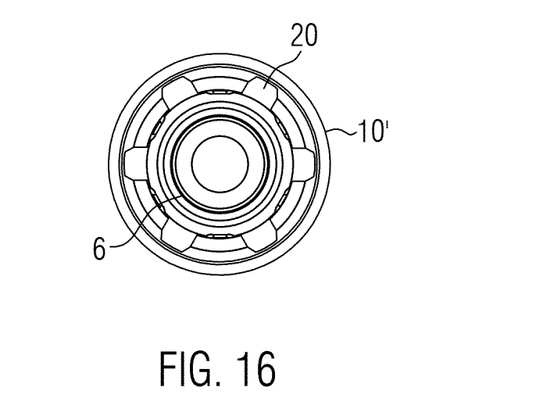
FIG. 16 shows an inner end view of the flow restricting orifice of FIG. 14, looking at the inner end of the insertion portion of the flow restricting orifice of FIG. 14.

In FIGS. 14 to 16 an alternative second embodiment of a flow restricting orifice 2' is illustrated. The flow restricting orifice 2' comprises a tubular nozzle of similar or identical design as the tubular nozzle 4 of the first embodiment shown in FIGS. 1 to 5. In contrast to the first embodiment the second embodiment of FIGS. 14 to 16 comprises a coloured ring element 10' that is formed as an axially extensive sleeve which axially projects beyond the outer end portion of the tubular nozzle 4. In the illustrated second embodiment the coloured ring element 10' has the form of an axially extensive sleeve and has a larger axial extension than the tubular nozzle 4. At the end portion of the coloured ring element 10' overlapping with outer end portion of the tubular sleeve the coloured ring element 10' is provided with a radially inwardly projecting, circumferentially extending protrusion in a manner corresponding to the protrusion 11 shown in FIGS. 2, 4 and 5 of the first embodiment.

Also the frangible connection is of the same design as the frangible connection 12 shown in FIGS. 4 and 5 for the first embodiment. The flow restricting orifice 2' of the second embodiment is preferably formed as a single piece by injection molding.

At the end of the sleeve of the coloured ring element 10' overlapping with the tubular nozzle the wall of the sleeve is provided with openings 20 which serve as windows to allow visual inspection whether a tube that is inserted into the opening of the sleeve eventually reaches the end position inside the coloured ring element and abuts with its front end against the circumferential protrusion of the coloured ring element, as will be further explained below.

FIGS. 17 to 20 show in perspective views a sequence of steps when a tube 40 is connected to a tube connector 30 which is equipped with a flow restricting orifice 2', wherein the sequence of steps is shown in FIGS. 21 to 24 in cross-sectional views. The tube connector 30 is of the same design as described in connection with FIGS. 6 to 13.

Figures 17, 18, 19:
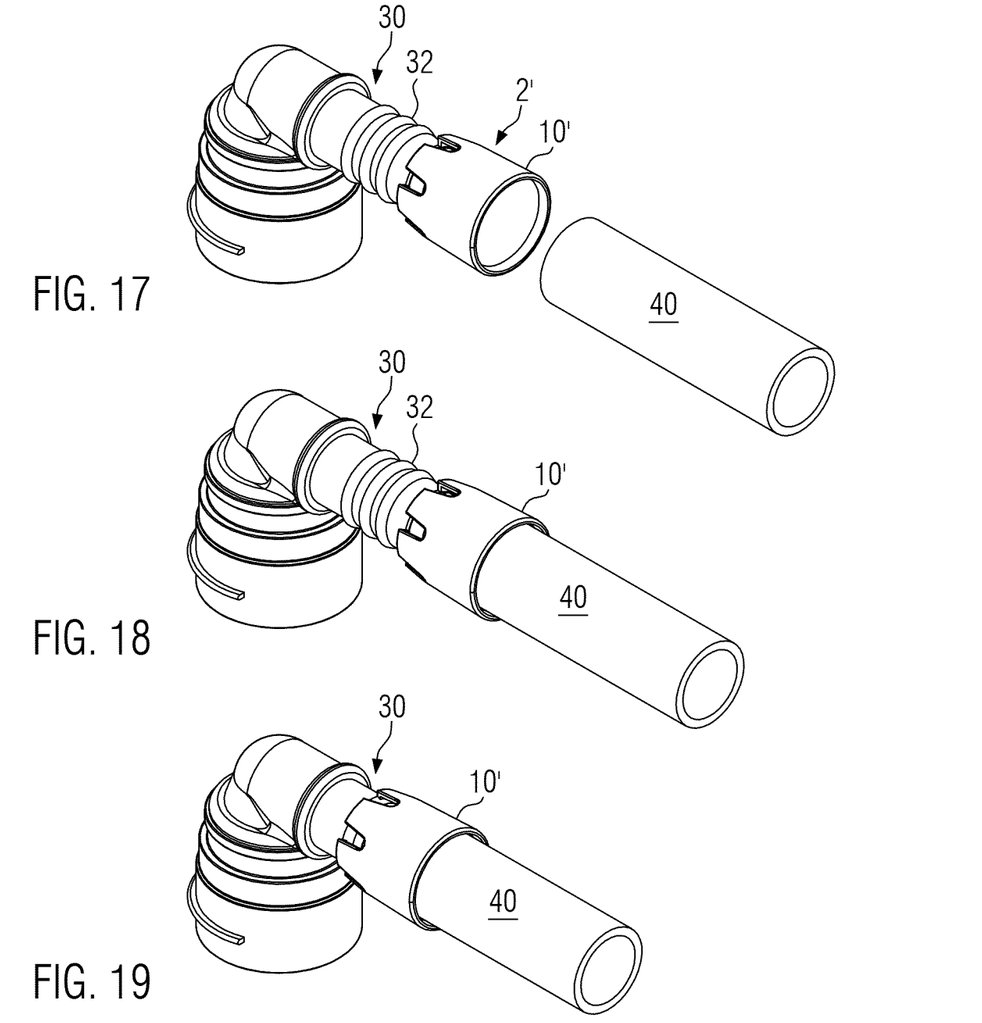
FIGS. 17 to 20 show a sequence of states when a tube is connected to a tube connector which is equipped with a flow restricting orifice of FIG. 14.

In FIG. 17 the flow restricting orifice 2' has been inserted with its insertion portion 6 into a mouth of the tube connector 30, and the tube 40 is advanced to be inserted into the opening of the coloured ring element 10' as shown in FIG. 18.

Figure 22:
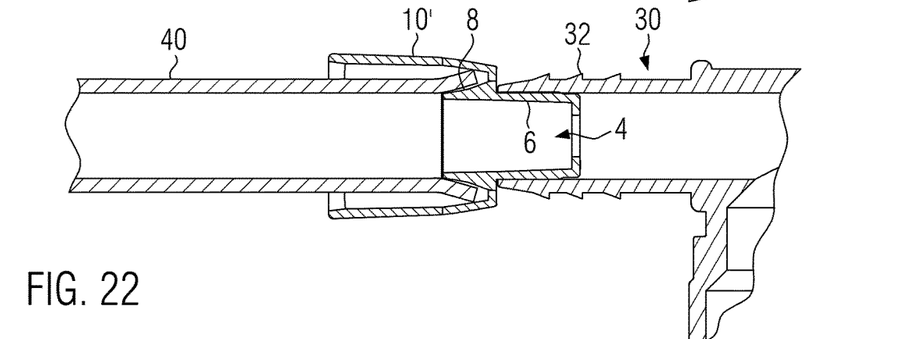

As shown in FIG. 22 the front end of the tube 40 at this stage approaches the inner wall of the coloured ring element 10' and its circumferential protrusion at the front end, thereby exerting radially directed and axially directed force on the coloured ring 10' element causes which the frangible connection to the outer end portion 8 of the tubular sleeve 4 to break.

Figure 23:
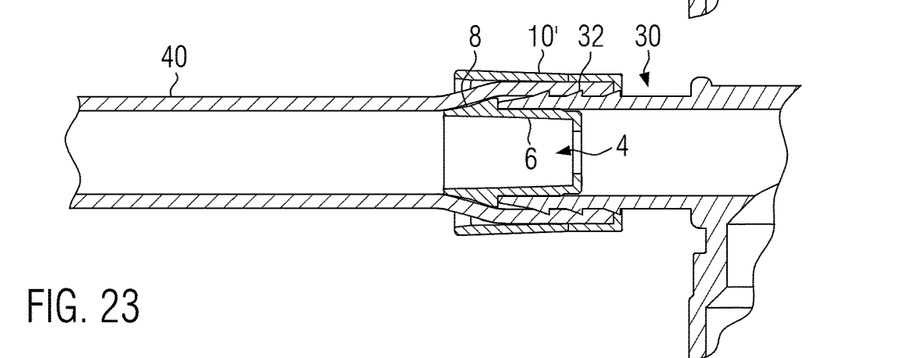

The coloured ring element 10' is then advanced together with the tube which is being pushed further onto the fir-tree portion 32 of the tube connector 30, as shown in FIGS. 19 and 23. As can be seen in FIG. 23 in the course of this movement the tube end being pushed on the fir-tree portion 32 of the tube connector 30 is slightly expanded which also causes a slight radial expansion of the coloured ring element 10'. The effect of this expansion will be discussed further below.

Figure 20:
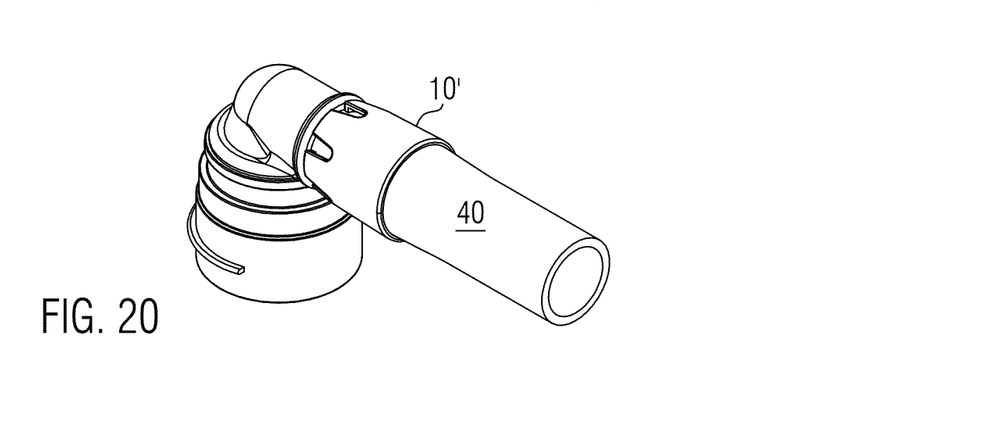
Figure 21:
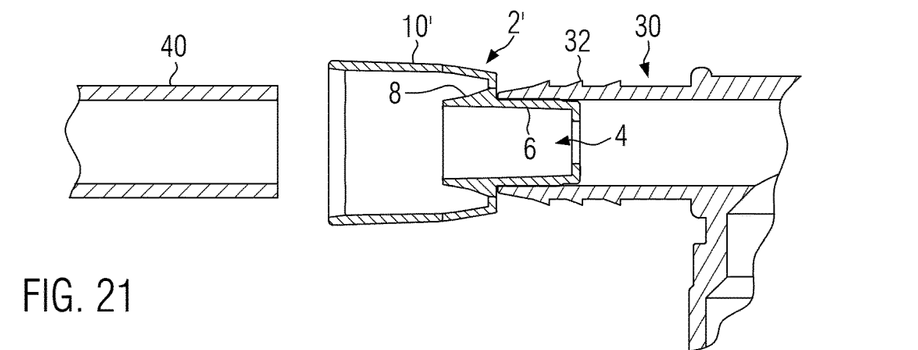
FIGS. 21 to 24 show cross-sectional views of the sequence of states when the tube is connected to the tube connector which is equipped with the flow restricting orifice of FIG. 14.
Figure 24:
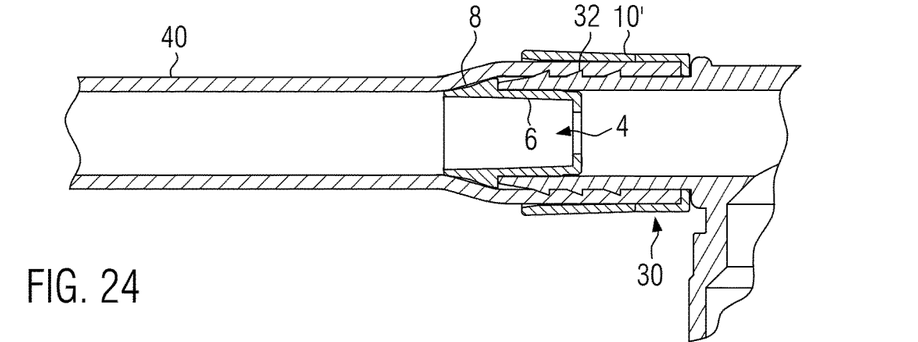

The tube 40 is then further pushed to move axially onto the tube connector, until it reaches its connected end position as shown in FIGS. 20 and 24. In this end position the inwardly projecting protrusion at the front end of the coloured ring element 10' is engaged between the front end of the tube and a collar on the tube connector.

In this connected position of the tube on the tube connector the coloured ring element 10' again remains as a visible indicator that indicates, by its colour, the size (flow restriction capacity) of the tubular nozzle 4 of the flow restrictor.

One advantage of the second embodiment with the coloured ring element 10' as an axially extensive sleeve is that the coloured ring element 10' by its size has enhanced visibility and therefore makes visual inspection very simple.

A further advantageous effect of the flow restricting orifice 2' of the second embodiment is a further function of the coloured ring element 10' in the form of an axially extensive sleeve. This function is also referred to as wedding-band function of the sleeve of the coloured ring element 10' which embraces and engages the tube end portion around the tube connector and which thereby increases the burst strength of the connection of the tube 40 on the tube connector 30. The engagement of the coloured ring element 10' on the outer wall of the tube 40 is enhanced when the tube portion that is pushed onto the fir-tree portion 32 of the tube connector 30 is expanded and urged against the inner wall of the coloured ring element 10', thereby also expanding the coloured ring element 10' which causes a tight engagement of the coloured ring element 10' around the front end portion of the tube in its connected position.

In the Figures and the description of the method for equipping a tube connector with a flow restricting orifice and for connecting a tube it was assumed that the flow restricting orifice 2, 2' is first inserted with its insertion portion 6 into a mouth of the tube connector 30, whereafter the tube end portion is moved onto the fir-tree portion of the tube connector 30. However, it is also possible to first introduce the tube end portion of the tube 40 into the coloured ring element 10, 10' of the flow restricting orifice 2, 2', and then to move the tube with the flow restricting orifice 2, 2' on its end portion towards the tube connector, to thereby introduce the insert portion 6 of the flow restricting orifice into the mouth of the tube connector, whereafter the tube is further pushed onto the fir-tree portion 32 of the tube connector 30, thereby breaking the frangible connection 12 to release the coloured ring element 10, 10' and to push it further onto the tube connector until the tube 40 reaches its connected position with the coloured ring element surrounding the front end portion of the tube or of the tube connector in front of the tube as a visible indicator.

The invention claimed is:

1. An assembly for connecting a tube, said assembly comprising:
   a tube connector (30); and
   a flow restricting orifice (2; 2'), the flow restricting orifice comprising;
      a tubular nozzle (4) having an insert portion (6) for insertion into a mouth of the tube connector;
      a visible marking having a marking element (10; 10') which extends radially outwardly from the tubular nozzle (4) and which includes a frangible connection (12) which is connected to the tubular nozzle and which has at least one predetermined breaking point (14), the frangible connection (12) being configured to release the marking element when the frangible connection (12) is broken before the tube is completely pushed onto the tube connector, the marking element being configured to be retained on the tube connector or on the tube connected to the tube connector to remain, after the tube has been connected to the tube connector (30), as a marking element visible from the exterior of the tube, wherein the flow restricting orifice (2; 2') is fitted in a the mouth of the tube connector (30).

2. The assembly according to claim 1, wherein the marking element is a marking ring element which surrounds the tubular nozzle (4) and extends circumferentially at least 180° around the tubular nozzle.

3. The assembly according claim 2, wherein the predetermined breaking point (14) of the frangible connection (12) is in radial direction of the tubular nozzle located closer to the tubular nozzle (4) than to the surrounding marking element.

4. The assembly according to claim 2, wherein the visible marking is a colour marking and the marking element is a coloured element.

5. The assembly according to claim 1, wherein the tubular nozzle comprises (4) an outer end portion (8) adjoining the insert portion (6), which outer end portion (6) has a circumferential shoulder for limiting movement of the tubular nozzle (4) into a mouth of the tube connector, and in that the frangible connection (12) is connected to the outer end portion (8) of the tubular nozzle.

6. The assembly according to claim 1, wherein the predetermined breaking point (14) of the frangible connection (12) is in a radial direction of the tubular nozzle located closer to the tubular nozzle (4) than to the surrounding marking element.

7. The assembly according to claim 1, wherein the frangible connection (12) is formed by one or more connecting webs radially extending from the marking element and being connected to the tubular nozzle (4), each of the one or more connecting webs having a predetermined breaking point (14) with a rated breakage strength.

8. The assembly according to claim 7, wherein a width of the one or more radially extending connecting webs is decreasing from the marking element towards the outer end portion (8) of the tubular nozzle.

9. The assembly according to claim 1, wherein the visible marking is a colour marking and the marking element is a coloured element.

10. The assembly according to claim 1 wherein the marking ring element is a closed ring surrounding the circumference of the tubular nozzle member (4).

11. The assembly according to claim 1, wherein the frangible connection (12) is configured to break upon the tube being pushed onto the tube connector, and in that the marking element is configured to be capable of being pushed onto the tube connector by a front end of the tube being pushed onto the tube connector.

12. The assembly according claim 1, wherein the marking ring element (10') is formed as an axially extending cylindrical sleeve having an axial length that is larger than half of an outer diameter of the marking ring element.

13. The assembly according to claim 12, wherein the cylindrical sleeve comprises at least one opening (20) in an outer wall of the cylindrical sleeve close to a leading end of the cylindrical sleeve which is leading when the cylindrical sleeve is pushed onto the tube connector by an advancing tube to be connected thereto, the at least one opening (20) being configured to serve as a window to allow visual inspection whether the tube has reached the region of the sleeve in which the at least one opening is located.

14. The assembly according to claim 1, wherein the tubular nozzle (4), the visible marking including the marking element and the frangible connection (12) connected to the tubular nozzle (4) are formed as an integral part in one piece, optionally wherein the flow restricting orifice is an injection molded plastic part.

15. A method for equipping a tube connector (30) with a flow restricting orifice (2; 2') and for connecting a tube (40) to the tube connector (30) equipped with the flow restricting orifice (2; 2'), the method comprising the steps:

providing an assembly comprising a tube connector (30) and a flow restricting orifice, said flow restricting orifice comprising a tubular nozzle (4) having an insert portion (6) for insertion into a mouth of the tube connector; and a visible marking having a marking element which extends radially outwardly from the tubular nozzle (4) and which includes a frangible connection (12) which is connected to the tubular nozzle and which has at least one predetermined breaking point (14), the frangible connection (12) being configured to release the marking element when the frangible connection (12) is broken before the tube is completely pushed onto the tube connector, the marking element being configured to be retained on the tube connector or on the tube connected to the tube connector to remain, after the tube has been connected to the tube connector (30), as a marking element visible from the exterior of the tube, wherein the flow restricting orifice is fitted in the mouth of the tube connector (30); and wherein the insert portion (6) of the flow restricting orifice is inserted into the mouth of the tube connector (30);

breaking the frangible connection (12) to release the marking element and moving the marking element further along the tube connector (30); and, pushing the tube (40) onto the tube connector (30) to connect the tube to the tube connector (30), the marking element remaining as a visible indicator retained at an end portion of the tube connector (30) in front of the connected tube (40) or at a front end portion of the tube (40).

16. The method according to claim 15, wherein the insert portion (6) of the tubular nozzle (4) is first inserted into the mouth of the tube connector (30), whereafter the frangible connection (12) is broken by pushing the tube (40) onto the tube connector (30) such that a front end of the tube (40) pushes against the marking element causing the frangible connection (12) to break and moving the marking element forward by the advancing tube (40) until the tube (40) reaches a connected position on the tube connector (30).

* * * * *